(12) United States Patent
Chapple et al.

(10) Patent No.: US 10,156,290 B2
(45) Date of Patent: Dec. 18, 2018

(54) BELT DRIVE TENSIONING SYSTEM

(71) Applicant: FLIR Belgium BVBA, Meer (BE)

(72) Inventors: Samuel S. Chapple, Goleta, CA (US); Michael Kent, Santa Barbara, CA (US)

(73) Assignee: FLIR Belgium BVBA, Meer (BE)

( * ) Notice: Subject to any disclaimer, the term of this patent is extended or adjusted under 35 U.S.C. 154(b) by 0 days.

(21) Appl. No.: 15/017,204

(22) Filed: Feb. 5, 2016

(65) Prior Publication Data
US 2016/0230851 A1    Aug. 11, 2016

Related U.S. Application Data

(60) Provisional application No. 62/113,314, filed on Feb. 6, 2015.

(51) Int. Cl.
| | |
|---|---|
| F16H 7/00 | (2006.01) |
| F16H 7/22 | (2006.01) |
| F16H 7/14 | (2006.01) |
| F16H 7/12 | (2006.01) |
| B62J 13/00 | (2006.01) |
| F16D 1/00 | (2006.01) |
| F16H 57/02 | (2012.01) |
| F16H 57/035 | (2012.01) |
| F16H 7/08 | (2006.01) |

(52) U.S. Cl.
CPC ............. *F16H 57/035* (2013.01); *F16H 7/08* (2013.01)

(58) Field of Classification Search
CPC ...... F16H 7/08; F16H 7/18; F16H 2007/0872; F16H 2007/0893; F16H 2007/0806

USPC ........................... 474/88, 101, 113, 136, 144
See application file for complete search history.

(56) References Cited

U.S. PATENT DOCUMENTS

| | | | | |
|---|---|---|---|---|
| 1,360,032 | A * | 11/1920 | Schiffner ................. | B62M 1/00 280/261 |
| 2,196,479 | A * | 4/1940 | Sloan ........................ | F16H 7/08 474/89 |
| 3,020,780 | A * | 2/1962 | Mclerran ................. | F16H 37/00 464/158 |
| 3,124,336 | A * | 3/1964 | Scanlin et al. .......... | B63B 21/16 114/210 |
| 3,145,575 | A * | 8/1964 | Bellmann .............. | B23Q 5/142 474/58 |
| 3,191,450 | A * | 6/1965 | Wilson ..................... | E21B 3/02 173/197 |
| 3,191,452 | A * | 6/1965 | Lipski ..................... | F16H 1/006 474/58 |
| 3,304,924 | A * | 2/1967 | Dolza ....................... | F01L 1/02 123/90.31 |
| 3,422,692 | A * | 1/1969 | Woodring ............. | F16H 7/1263 474/136 |
| 3,572,147 | A * | 3/1971 | Obenshain ................ | F16H 9/00 474/86 |

(Continued)

*Primary Examiner* — Henry Y Liu
(74) *Attorney, Agent, or Firm* — Haynes and Boone, LLP

(57) ABSTRACT

Various techniques are provided to maintain drive belts at substantially constant tension over a wide range of conditions. In one embodiment, a system includes a housing, a bracket secured to the housing, first and second pulleys, and a belt engaged in tension with the first and second pulleys. The first and second pulleys are suspended from the housing through the bracket to reduce effects of thermal expansion of the housing on the belt tension. Other systems and related methods are also provided.

20 Claims, 15 Drawing Sheets

(56) References Cited

U.S. PATENT DOCUMENTS

| | | | | |
|---|---|---|---|---|
| 3,636,995 | A * | 1/1972 | Newman | B27B 17/14 30/386 |
| 3,702,570 | A * | 11/1972 | Stikkers | F16H 7/14 474/113 |
| 4,028,964 | A * | 6/1977 | Jones | F16H 7/06 474/133 |
| 4,593,731 | A * | 6/1986 | Tanaka | B23Q 5/04 144/145.2 |
| 4,600,355 | A * | 7/1986 | Johnson | B25J 9/046 248/558 |
| 4,761,154 | A * | 8/1988 | Beauchamp | F16H 7/1263 474/101 |
| 4,826,468 | A * | 5/1989 | Friedrichs | F16H 7/08 474/101 |
| 4,832,661 | A * | 5/1989 | Wagner | H02K 7/1004 474/113 |
| 4,832,663 | A * | 5/1989 | Howard, Jr. | B65H 54/38 474/88 |
| 5,030,173 | A * | 7/1991 | Bryant | B65G 23/44 474/136 |
| 5,064,340 | A * | 11/1991 | Genov | B25J 9/042 414/744.5 |
| 5,730,691 | A * | 3/1998 | Tokura | B23Q 1/0018 29/40 |
| 6,146,296 | A * | 11/2000 | Apostolo | F16H 61/66231 192/115 |
| 6,237,228 | B1 * | 5/2001 | Moody | B27B 17/14 30/381 |
| 6,471,504 | B1 * | 10/2002 | Matsui | B25J 9/046 414/728 |
| 6,485,383 | B1 * | 11/2002 | Hendricks | B41J 19/20 474/101 |
| 6,599,209 | B1 * | 7/2003 | Ullein | F16H 7/08 474/111 |
| 6,609,985 | B2 * | 8/2003 | Todd | F16H 7/0829 474/103 |
| 6,945,889 | B2 * | 9/2005 | Markley | F16H 7/0848 474/109 |
| 7,081,059 | B2 * | 7/2006 | Iwamoto | F01L 1/024 137/554 |
| 7,247,109 | B2 * | 7/2007 | Youn | B41J 19/005 474/109 |
| 7,299,130 | B2 * | 11/2007 | Mulligan | B64C 39/024 340/961 |
| 7,338,400 | B2 * | 3/2008 | Pierjok | F16H 7/14 417/359 |
| 7,647,679 | B2 * | 1/2010 | Sheehan | B23Q 16/025 29/40 |
| 7,758,460 | B2 * | 7/2010 | Osakabe | B41J 19/005 399/211 |
| 8,047,940 | B2 * | 11/2011 | Takai | B29C 65/4835 399/307 |
| 8,052,559 | B2 * | 11/2011 | Wigsten | F16H 7/0831 474/109 |
| 8,434,236 | B2 * | 5/2013 | Pellenc | B27B 17/14 30/381 |
| 8,595,943 | B2 * | 12/2013 | Buttery | B27B 17/14 30/381 |
| 9,377,097 | B2 * | 6/2016 | Hoffman | F16H 57/021 |
| 2002/0063197 | A1 * | 5/2002 | Voigt | G01C 21/18 248/660 |
| 2002/0182063 | A1 * | 12/2002 | Edsinger | F04D 25/02 415/124.1 |
| 2003/0087713 | A1 * | 5/2003 | Todd | F16H 7/0829 474/111 |
| 2004/0152548 | A1 * | 8/2004 | Markley | F16H 7/0848 474/140 |
| 2005/0148419 | A1 * | 7/2005 | Gosz | A22C 7/00 474/101 |
| 2005/0225189 | A1 * | 10/2005 | Voigt | G01C 19/30 310/112 |
| 2006/0074557 | A1 * | 4/2006 | Mulligan | B64C 39/024 701/13 |
| 2006/0205548 | A1 * | 9/2006 | Konno | F16H 7/18 474/111 |
| 2006/0247080 | A1 * | 11/2006 | Wigsten | F16H 7/08 474/111 |
| 2006/0281594 | A1 * | 12/2006 | Markley | F16H 7/0848 474/109 |
| 2007/0217000 | A1 * | 9/2007 | Baun | G02B 23/00 359/399 |
| 2007/0259744 | A1 * | 11/2007 | Lehtovaara | F16H 7/08 474/111 |
| 2008/0003029 | A1 * | 1/2008 | Fujimori | G03G 15/2053 399/329 |
| 2009/0007406 | A1 * | 1/2009 | Sheehan | B23Q 16/025 29/40 |
| 2009/0156339 | A1 * | 6/2009 | Yokoyama | F16H 7/18 474/111 |
| 2009/0245843 | A1 * | 10/2009 | Sato | G03G 15/2039 399/69 |
| 2009/0245899 | A1 * | 10/2009 | Sato | G03G 15/2053 399/329 |
| 2009/0275431 | A1 * | 11/2009 | Wigsten | F16H 7/0848 474/111 |
| 2010/0075789 | A1 * | 3/2010 | Chekansky | F16H 7/0848 474/110 |
| 2011/0077114 | A1 * | 3/2011 | Markley | F01L 1/02 474/111 |
| 2011/0105259 | A1 * | 5/2011 | Fuhrmann | F16H 7/18 474/111 |
| 2011/0207567 | A1 * | 8/2011 | Kaiser | F16H 7/0836 474/110 |
| 2013/0005523 | A1 * | 1/2013 | Suchecki | F01L 1/022 474/101 |
| 2013/0090201 | A1 * | 4/2013 | Mori | F16H 7/18 474/140 |
| 2013/0095965 | A1 * | 4/2013 | Nakagawa | F16H 7/08 474/111 |
| 2014/0057749 | A1 * | 2/2014 | Konno | F16H 7/18 474/111 |
| 2014/0106915 | A1 * | 4/2014 | Kistler | F16H 7/08 474/111 |
| 2014/0256487 | A1 * | 9/2014 | Ketterl | F16H 7/18 474/111 |
| 2014/0265525 | A1 * | 9/2014 | Schafer | E01C 23/088 299/39.1 |
| 2015/0267792 | A1 * | 9/2015 | Hochmayr | F16H 63/065 474/14 |
| 2015/0362048 | A1 * | 12/2015 | Kastner | F16H 7/18 474/111 |
| 2015/0369345 | A1 * | 12/2015 | Lindner | F16H 7/08 474/111 |
| 2016/0040759 | A1 * | 2/2016 | Gergis | F16H 7/1281 474/113 |
| 2016/0069432 | A1 * | 3/2016 | Wach | F16H 7/18 474/111 |

* cited by examiner

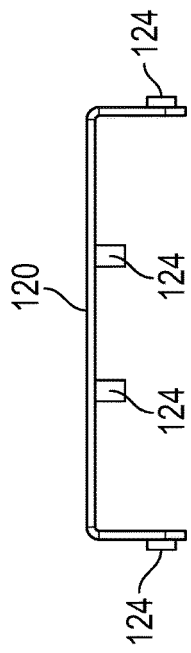
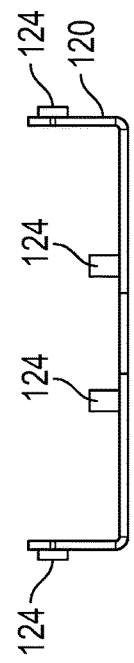
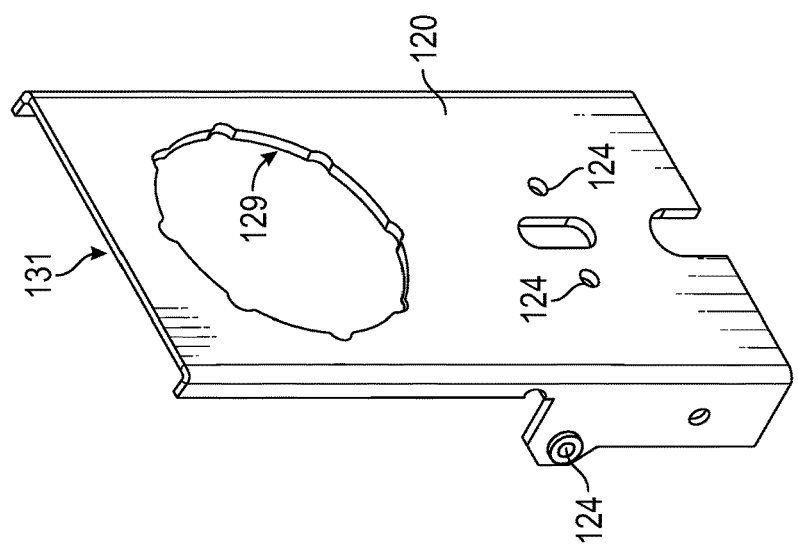
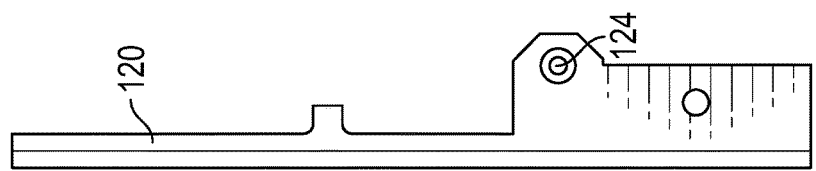

BELT DRIVE TENSIONING SYSTEM

CROSS-REFERENCE TO RELATED APPLICATIONS

This application claims priority to and the benefit of U.S. Provisional Patent Application No. 62/113,314 filed Feb. 6, 2015 and entitled "BELT DRIVE TENSIONING SYSTEM" which is hereby incorporated by reference in its entirety.

BACKGROUND

Technical Field

This disclosure relates to belt drives in general, and more particularly, to mechanisms for adjusting and maintaining drive belt tension in such drives.

Related Art

Belt drives are well known and widely used to replace gear train drives when the spacings between the centers of the gears of such drives become large enough to make it more advantageous to use continuous loop drive belts and complementary pulleys instead of intermeshing gears. Like gear train drives, belt drives are mechanically efficient and capable of functioning as speed/torque reducers and/or multipliers, and accordingly, have found advantageous application in a wide variety of technical fields.

One such application relates to imaging systems incorporating, e.g., thermal or infrared (IR) cameras and/or conventional TV cameras that are controllably "panned" and "tilted," i.e., moved independently in both azimuth and elevation, during use. Such imaging systems can be implemented, for example, in robust, weather-resistant housings that mount on fixed or mobile platforms, such as towers or marine vessels. In some embodiments, the housings can be rotated relative to a fixed base to effect panning of the cameras therein, and the cameras can be gimbaled within the housings for tilting movement thereof. Belt drives can be advantageously employed within such systems to effect one, the other or both of the camera panning and the tilting functions.

However, the use of belt drives in such applications can involve certain drawbacks. For example, when incorporated within plastic or other relatively low-stiffness structures, the mechanical properties of such structures can result in undesirable changes in drive belt tension over expected storage and operating conditions due to temperature changes, deflections, creep, or other dynamic properties. Accordingly, what is needed are belt drive mechanisms that overcome the foregoing and other problems of the prior art, that provide consistent tension in the drive belts of single and compound belt drives over a wide range of storage and operational conditions, and that reduce the complexity, cost, and weight of accessory tensioning mechanisms.

SUMMARY

In accordance with the present disclosure, example embodiments of belt drive mechanisms are provided that afford substantially constant tension in the drive belts of single and compound belt drives over a wide range of conditions and which, for example, may reduce the complexity, cost, and weight of accessory tensioning mechanisms.

In one embodiment, a system includes a housing; a bracket secured to the housing; first and second pulleys; a belt engaged in tension with the first and second pulleys; and wherein the first and second pulleys are suspended from the housing through the bracket to reduce effects of thermal expansion of the housing on the belt tension.

In another embodiment, a method includes driving a belt engaged in tension with first and second pulleys; rotating the first pulley by the belt; rotating a payload of an imaging system in response to the rotation of the first pulley; wherein the imaging system comprises a housing and a bracket secured to the housing; and wherein the first and second pulleys are suspended from the housing through the bracket to reduce effects of thermal expansion of the housing on the belt tension.

The scope of this invention is defined by the claims appended hereafter, which are incorporated into this section by reference. A more complete understanding of the features and advantages of the novel belt drive tensioning mechanisms of the invention, together with methods for making and using them, will be afforded to those skilled in the art by a consideration of the detailed description of some example embodiments thereof presented below, especially if such consideration is made in conjunction with the figures of the appended drawings described briefly below, in which like reference numerals are used to identify like elements illustrated therein.

BRIEF DESCRIPTION OF THE DRAWINGS

FIGS. 7A, 7B, 7C, 7D, 7E, 7F, and 7G are front elevation, left side elevation, rear elevation, right side elevation, upper, rear and left side perspective, upper end and lower end views, respectively, of the upper or second bracket of the example bracket assembly of FIGS. 5A-5D;

Embodiments of the invention and their advantages are best understood by referring to the detailed description that follows. It should be appreciated that like reference numerals are used to identify like elements illustrated in one or more of the figures.

DETAILED DESCRIPTION

In accordance with the present disclosure, example embodiments of belt drives are provided that afford substantially consistent tension in the drive belts of single and compound belt drives over a wide range of storage and operating conditions, and that eliminate or reduce the complexity, cost, and weight of accessory tensioning mechanisms. In some embodiments, the effects of thermal expansion and compression on belt tension can be substantially reduced or eliminated.

Figure 1:
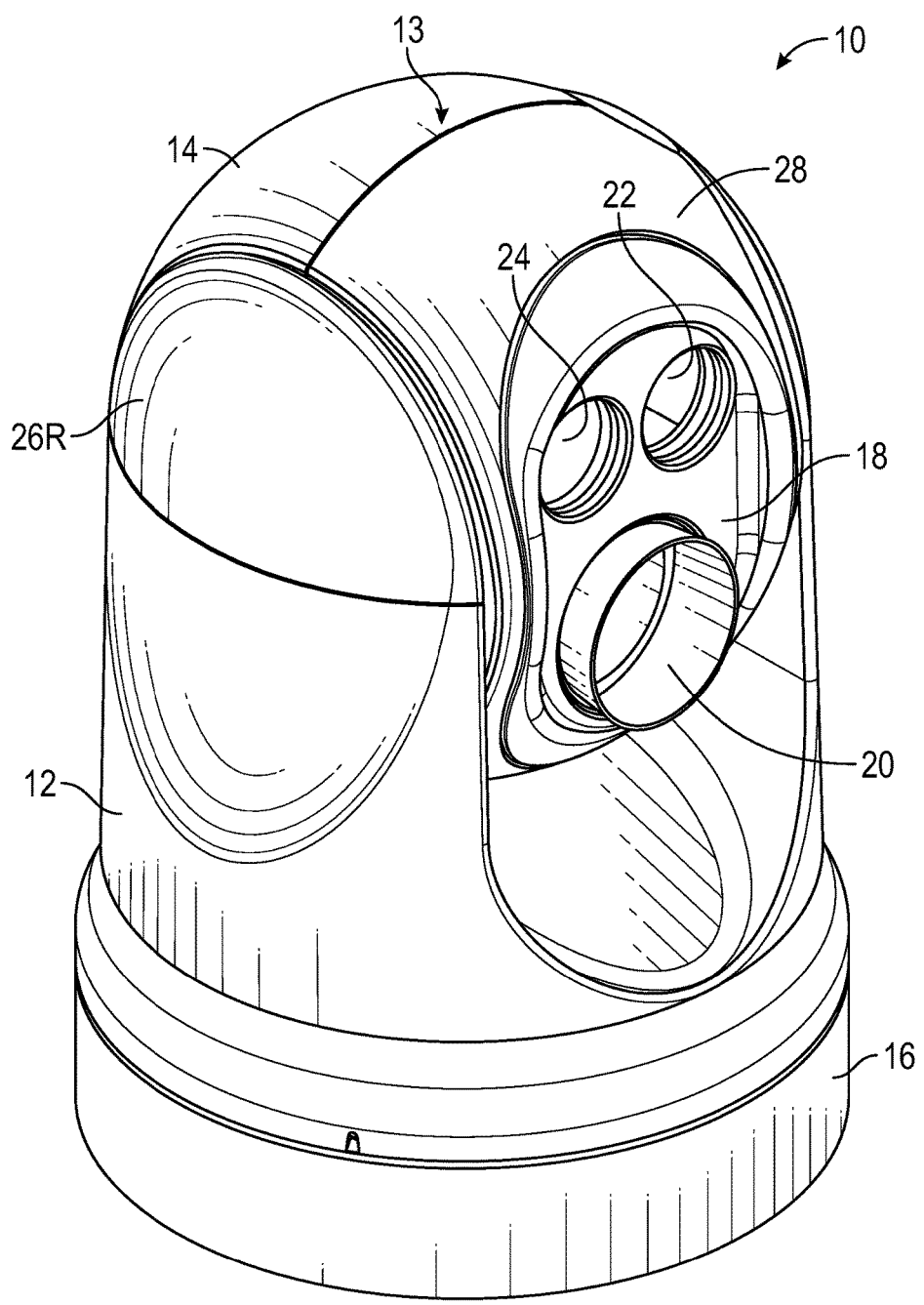
FIG. 1 is an upper, right and front side perspective view of an example embodiment of an imaging system within which a drive belt tensioning system in accordance with the present invention can be employed advantageously.
Figure 2:
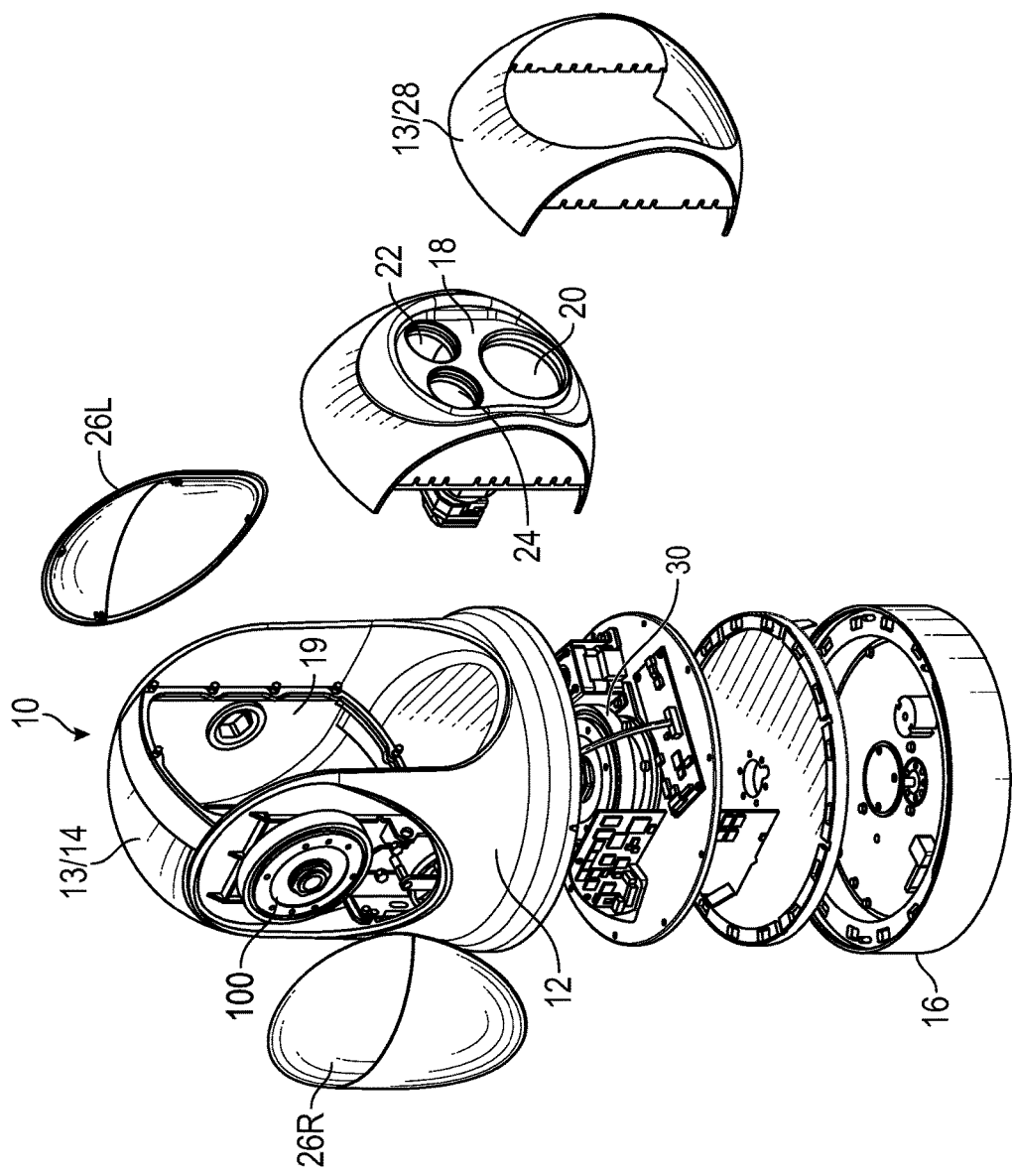
FIG. 2 is an exploded upper, right and front side perspective view of the example imaging system of FIG. 1.

FIG. 1 is an upper, right-and-front side perspective view of an example embodiment of an imaging system 10 within which one or more drive belt tensioning systems can be advantageously employed, and FIG. 2 is an exploded upper, right and front side perspective view of the system 10. In various embodiments, system 10 may be mounted on vehicle such as a watercraft, an aircraft, a spacecraft, an automobile or other land-based vehicle, or other locations as appropriate.

As illustrated in FIGS. 1 and 2, the system 10 may be implemented as a turret including a housing 12 which is arranged to rotate in azimuth (e.g., pan left and right) relative to a fixed base 16 through an angle of, for example, approximately 360 degrees. Housing 12 may be configured as a yoke (e.g., gimbal) to hold a ball 13 that pivots up and down in elevation (e.g., tilt) through an angle of, for example, approximately 180 degrees relative to housing 12 and base 16. The ball 13 includes hemispherical portions 14 and 28 surrounding a payload 18 which moves with ball 13 (e.g., payload 18 may be rotated with ball 13 in azimuth as housing 12 turns and tilted while ball 13 is held by the yoke of housing 12).

In the particular example embodiment illustrated in FIGS. 1 and 2, the payload 18 includes thermal cameras 20/22 (e.g., including a plurality of infrared detectors configured in focal plane arrays), a long range thermal camera 22, and a dual-function daylight/lowlight visible light camera 24, to provide imaging capabilities over a wide range of distances and lighting conditions. Of course, in other embodiments of such systems, the movement, number, and functionality of the cameras can vary. The outputs of the cameras 20, 22, and 24 can be displayed and/or recorded independently of or simultaneously with each other.

As illustrated in FIG. 2, removable access panels and covers, such as side access panels 26L and 26R, and front access cover 28 can be attached to housing 12, to provide service access to components disposed inside of the housing 12.

In the particular example embodiment of FIGS. 1 and 2, the panning movement of the ball 13 is effected by a drive mechanism 30 that rotates the entire housing 12 and ball 13 horizontally relative to the base 16. The tilting movement of the ball 13 is effected by a drive mechanism 100. Although the drive mechanism 100 is further discussed herein, features of the drive mechanism 100 may be applied to the drive mechanism 30 where appropriate.

In some embodiments, the housing 12 and base 16 can both be formed of plastic (e.g., acrylonitrile butadiene styrene (ABS)), polyurethane, fiber reinforced resin (e.g., fiberglass), or other appropriate material for weather resistance. In some embodiments, such materials may have relatively low stiffness and/or relatively high coefficients of thermal expansion (CTE). As a result, housing 12 and base 16 can expand and contract in response to temperature changes and/or other environmental conditions. In particular, if multiple interconnected components are each attached to housing 12, such expansion and contraction may result in deflections, creep, and/or other mechanical movement of the components. However, such problems can be substantially overcome in relation to drive mechanism 100 in accordance with various features discussed herein.

FIGS. 3A, 3B, 3C, and 3D are front elevation, left side elevation, rear elevation, and right side elevation views, respectively, of an example embodiment of drive mechanism 100 in accordance with the present invention. As shown, drive mechanism 100 includes a bracket 102, a motor 104 having a rotating output shaft 106, and a motor tensioning mechanism to adjustably couple the motor 104 to the bracket 102 at one of a plurality of positions thereon. The motor tensioning mechanism may include a plurality of elongated slots 107 disposed in the bracket 102 and a corresponding number of threaded fasteners 109 (e.g., machine screws), each having a head disposed on one side of the first bracket 102, and that extend through a corresponding one of the elongated slots 107 and into a corresponding and complementary threaded aperture disposed on a side of the first bracket 102 opposite to the head. In some embodiments, the threaded apertures can be formed in the body or a mounting base of the motor 104 itself, or alternatively or additionally, can comprise threaded nuts disposed on an upper surface of such a mounting base.

The position of the motor 104 relative to the bracket 102 can be adjusted by loosening the threaded fasteners 107, sliding the motor 104 to a new position on the bracket 102, and re-tightening the fasteners 107 at the new position. As discussed in more detail herein, this technique can be used to adjust the tension of a drive belt 132 of the drive mechanism 100 independently of the tension in other belts thereof.

The drive mechanism 100 further includes a driver pulley 110 that is coupled to the output shaft 106 of the motor 104 for conjoint rotation therewith. A shaft 112 is also coupled to the bracket 102 and a pulley assembly 114 (see, e.g., FIG. 4). Pulley assembly 114 includes a follower pulley 116 and a driver pulley 118 both rotatably disposed on the shaft 112 for conjoint rotation thereon.

A bracket 120 is also provided, together with a bracket tensioning mechanism for adjustably coupling bracket 120 to bracket 102 at one of a plurality of positions relative thereto. The bracket tensioning mechanism may include a plurality of elongated slots 121 disposed in the second bracket 120 and a corresponding number of threaded fasteners 122, each having a head disposed on one side of the first bracket 102 and extending through a corresponding one of the elongated slots and into a corresponding and complementary threaded aperture 124 disposed on a side of the second bracket 102 opposite to the head of the threaded fastener 122. In various embodiments, the threaded fasteners 122 can comprise, e.g., machine bolts, and the complementary threaded apertures can comprise, for example, swage nuts 124 that are captivated on the second bracket 120 (see, e.g., FIGS. 7A-7G). The position of bracket 120 relative to bracket 102 can be adjusted by loosening the threaded fasteners 122, sliding the bracket 120 to a new position relative to the bracket 102, and re-tightening the fasteners 122 at the new position. As discussed in more detail herein, this technique can be used to adjust the tension of a drive belt 134 of the drive mechanism 100 independently of the tension in other belts thereof.

Figure 3A:
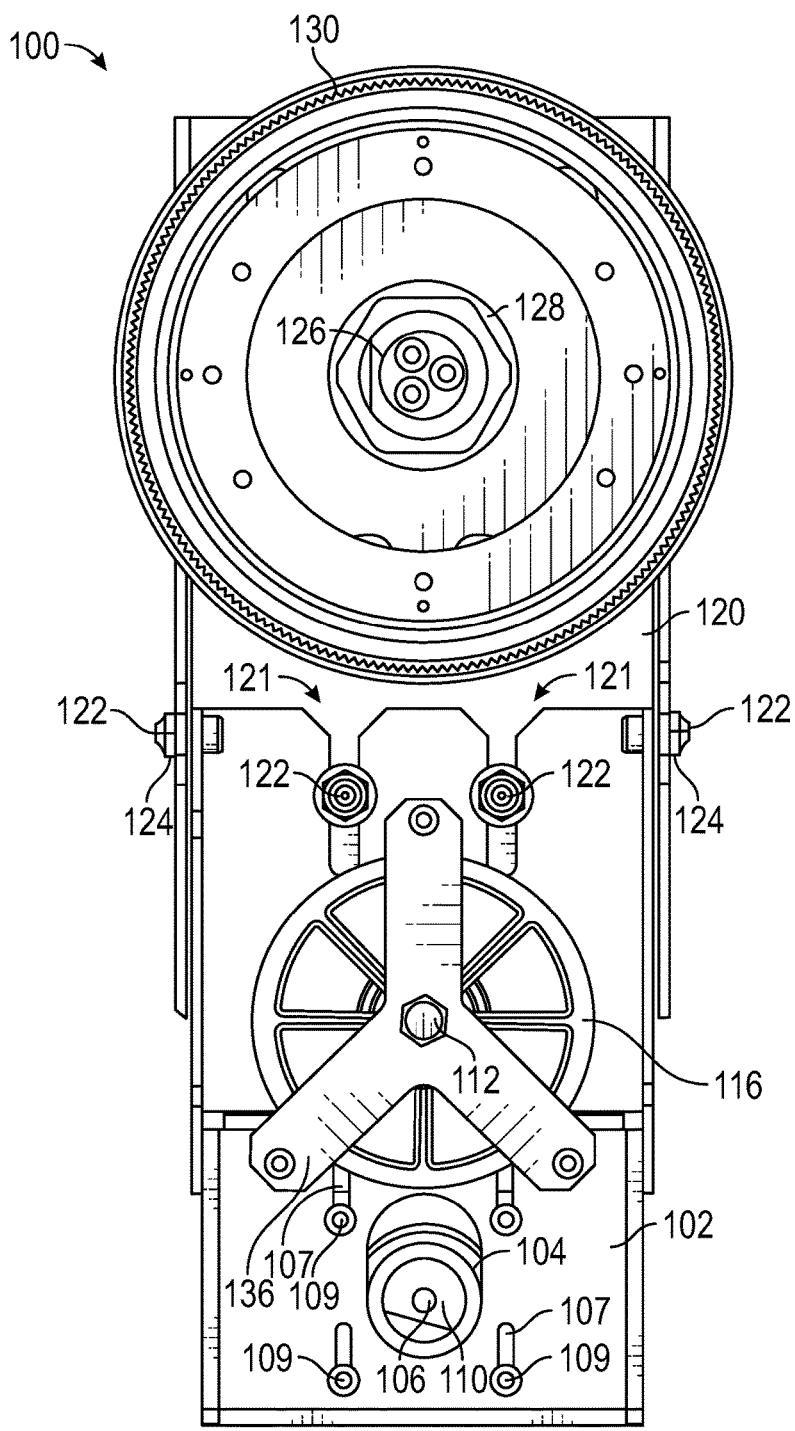
FIGS. 3A, 3B, 3C, and 3D are front elevation, left side elevation, rear elevation, and right side elevation views, respectively, of an example embodiment of a belt drive tensioning mechanism in accordance with the present invention.
Figure 3B:
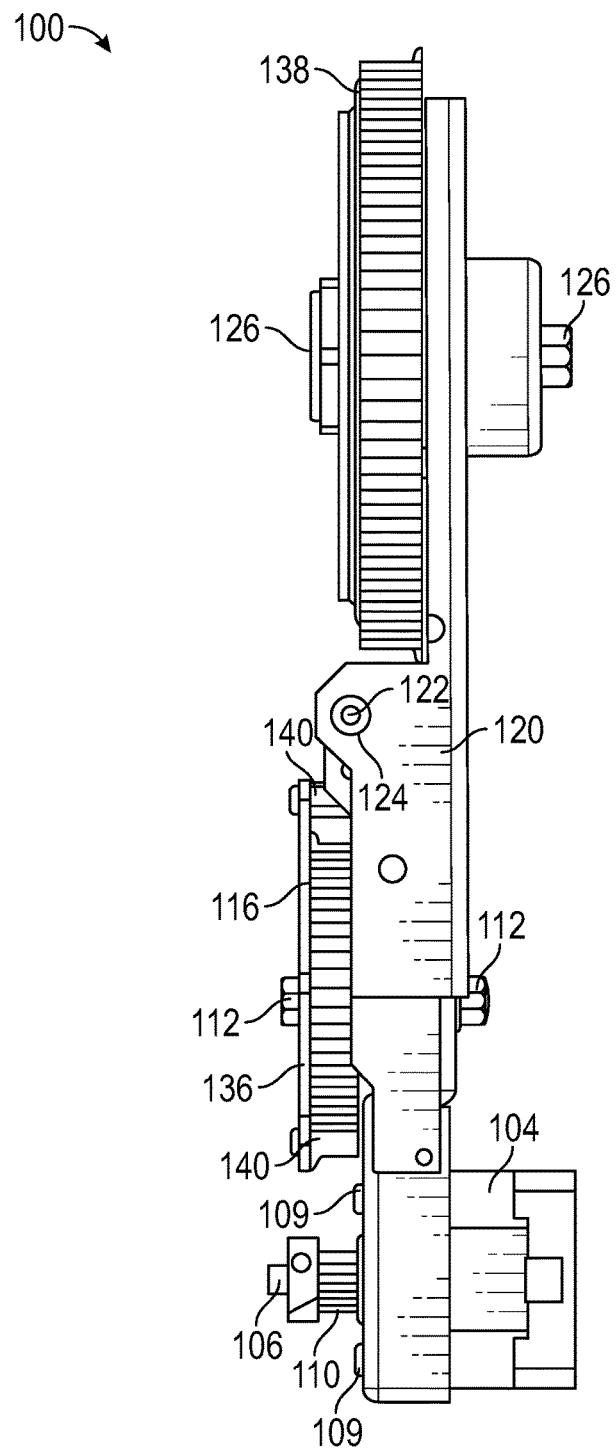
Figure 3C:
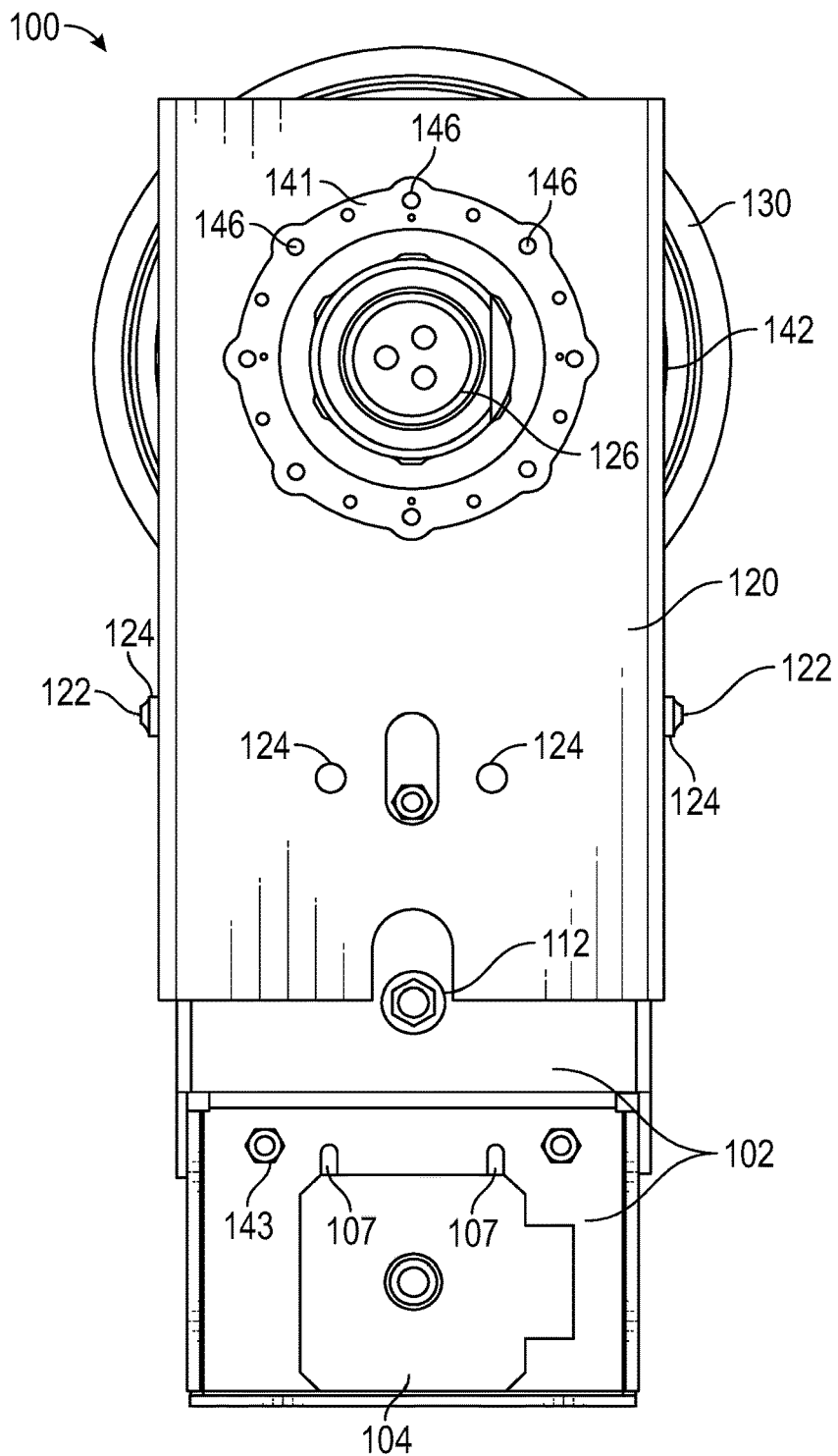
Figure 3D:
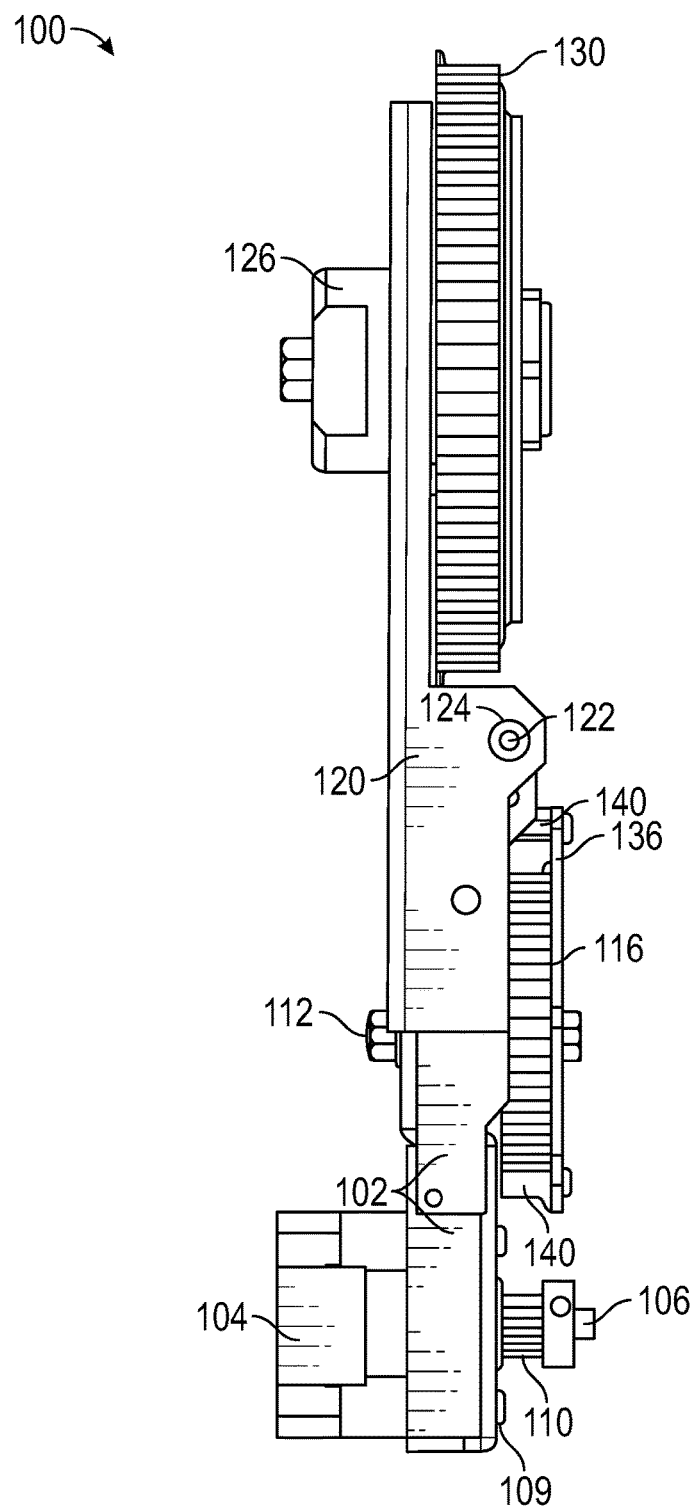
Figure 4:
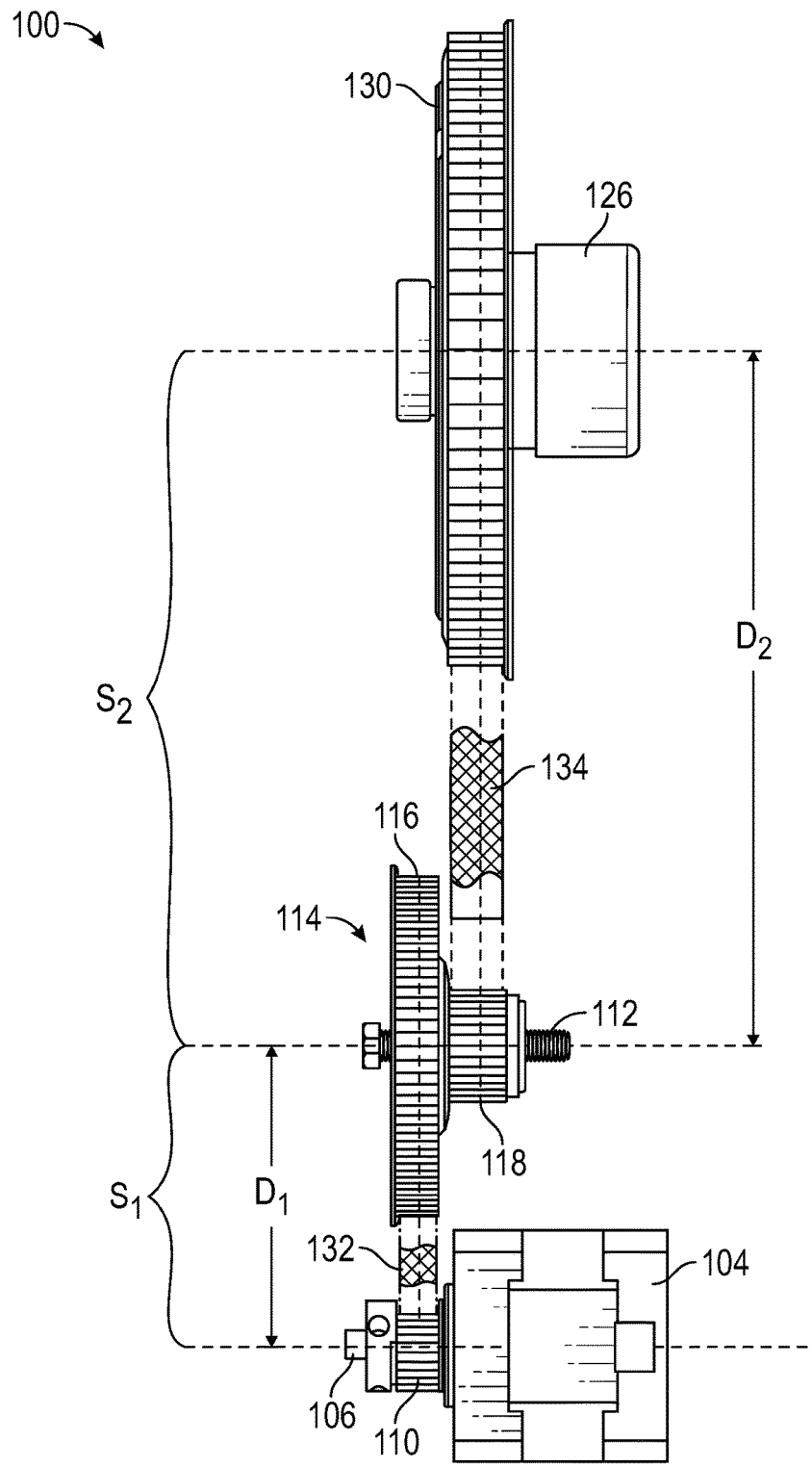
FIG. 4 is a partial left side elevation view of the example belt drive tensioning mechanism similar to that of FIG. 3B, in which a pair of component support brackets have been omitted to show pulleys and portions of drive belts of the mechanism.
Figure 5A:
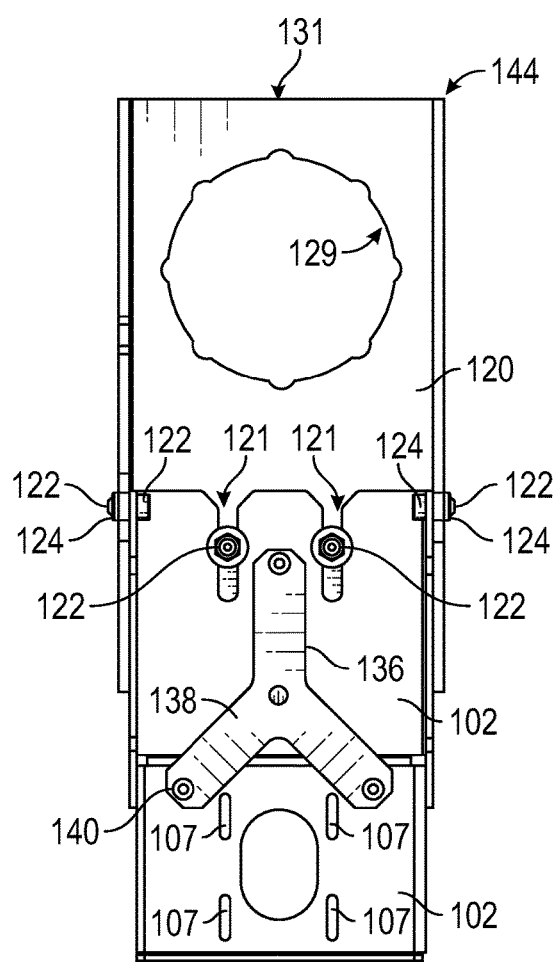
FIGS. 5A, 5B, 5C, and 5D are front elevation, left side elevation, rear elevation, and right side elevation views, respectively, of a chassis formed by an assembly of a lower or first bracket, an upper or second bracket, and a third, trefoil bracket of the example belt drive mechanism, in which a motor, pulleys and drive belts of the example mechanism have been omitted for purposes of illustration.
Figure 5B:
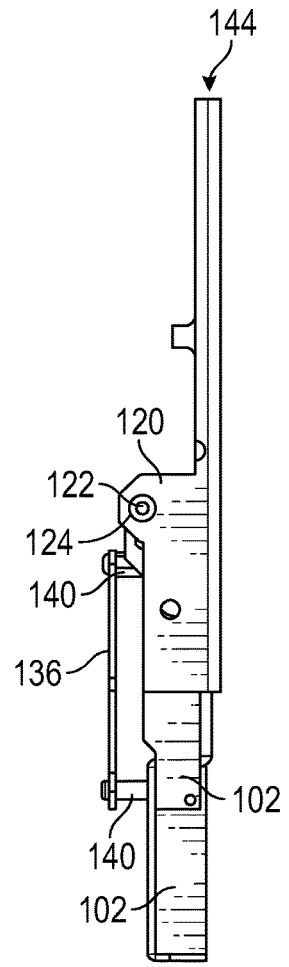
Figure 5C:
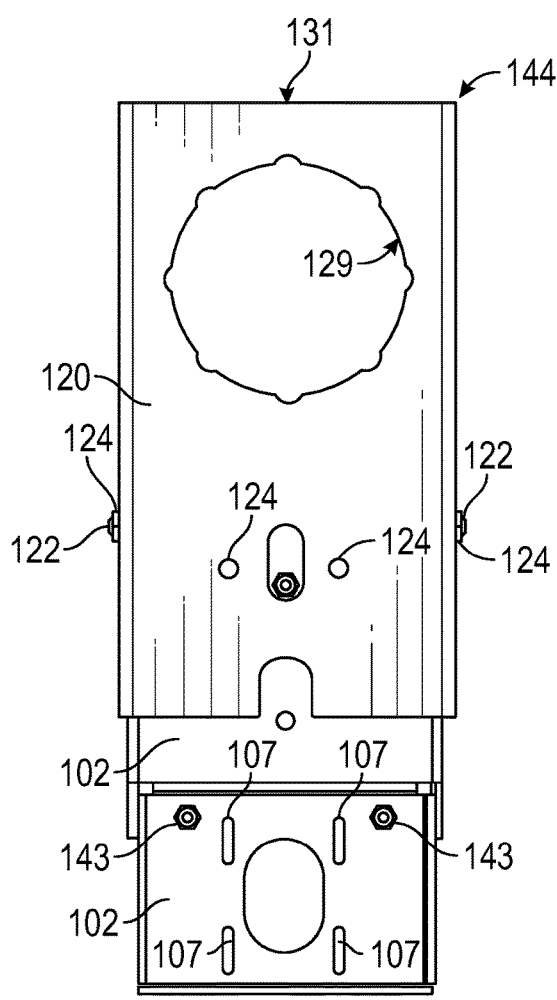
Figure 5D:
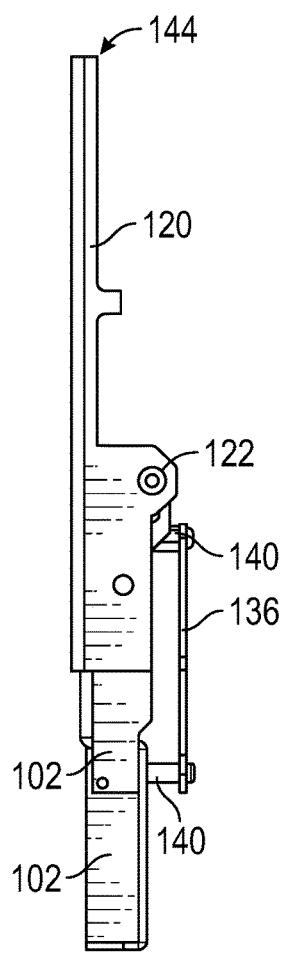
Figure 6A:
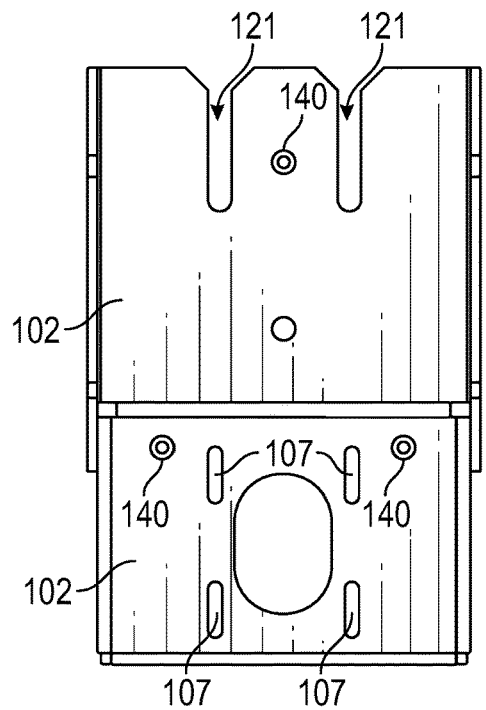
FIGS. 6A, 6B, 6C, 6D, 6E, 6F, and 6G are front elevation, left side elevation, rear elevation, right side elevation, upper, rear and left side perspective, upper end and lower end views, respectively, of the lower or first bracket of the example bracket assembly of FIGS. 5A-5D.
Figure 6B:
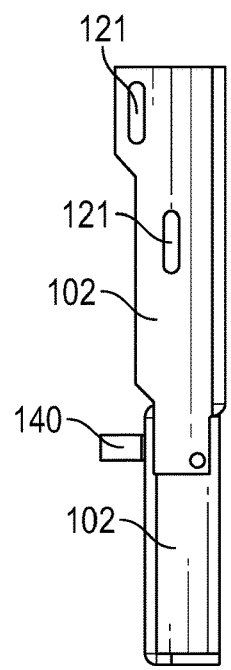
Figure 6C:
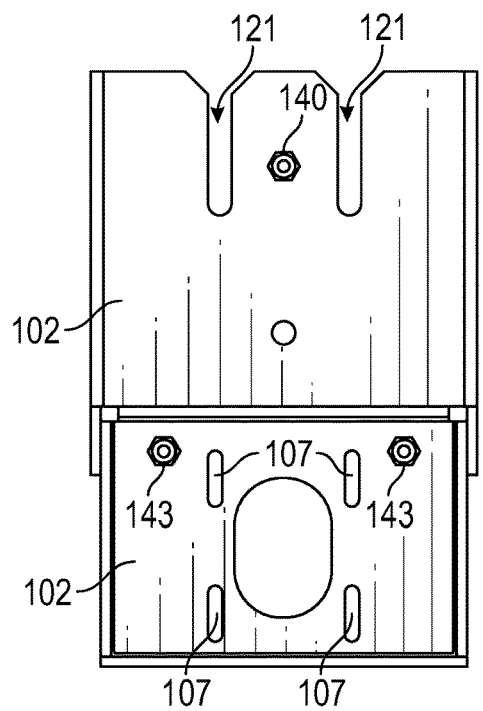
Figure 6D:
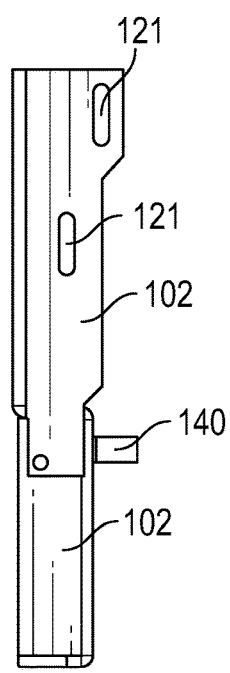
Figure 6E:
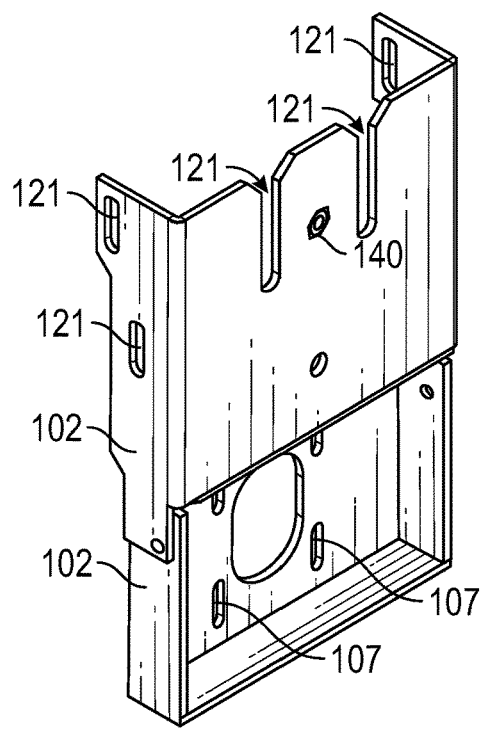
Figure 6F:
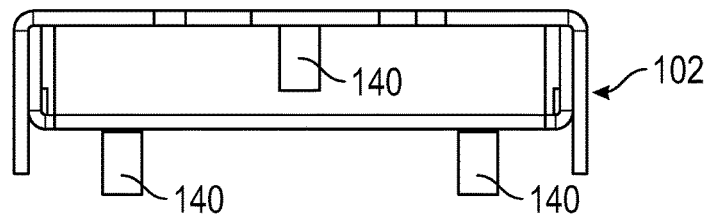
Figure 6G:
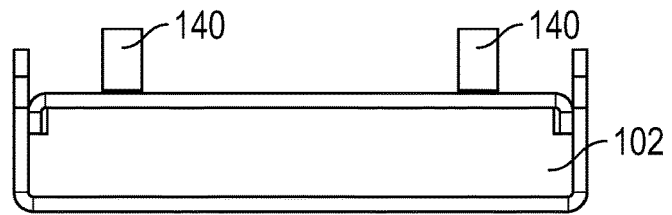
Figure 7C:
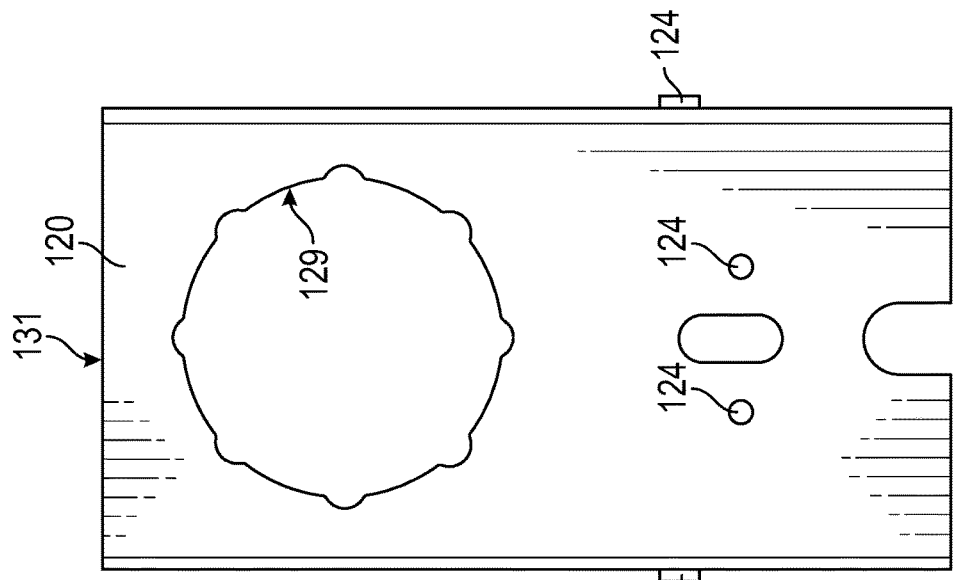
Figure 7B:
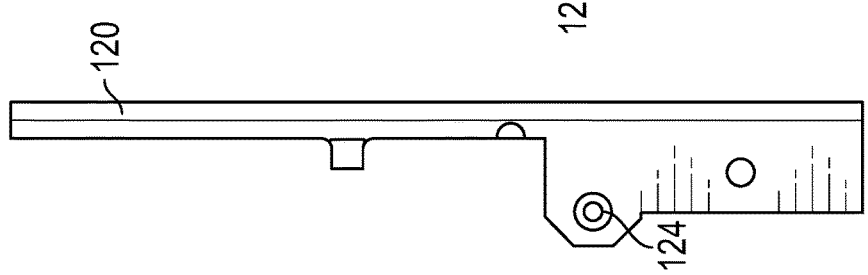
Figure 7A:
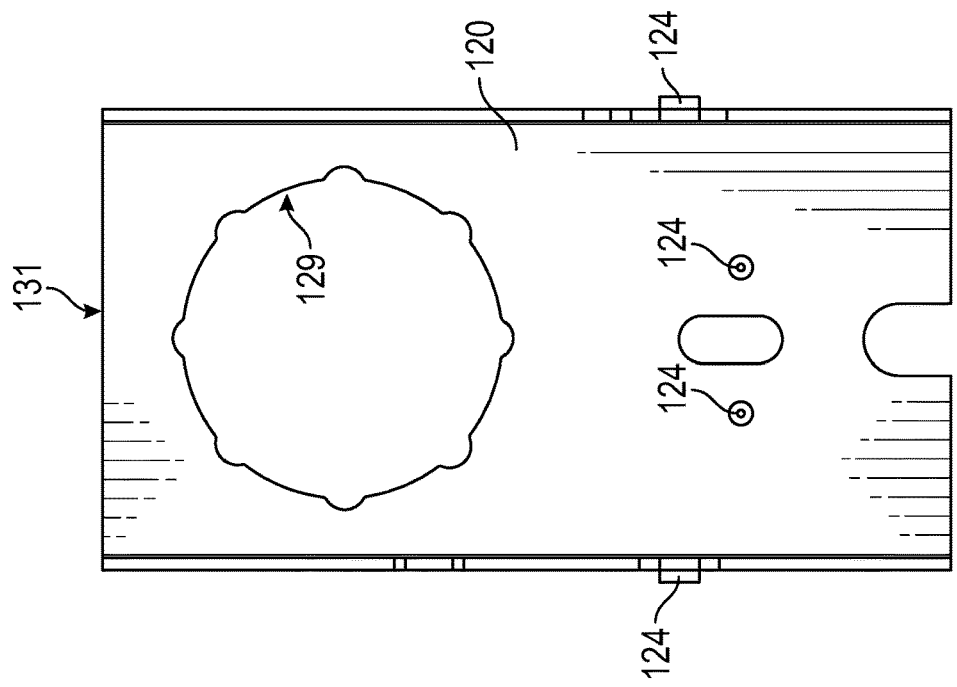

As illustrated in FIGS. 3A-3D and 4, the drive mechanism 100 further includes a shaft 126 that is rotatably coupled to the bracket 102, e.g., via a bearing assembly 128, and a follower pulley 130 that is disposed on the shaft 126 for conjoint rotation therewith. As illustrated in FIG. 4, a drive belt 132 couples the driver pulley 110 to the follower pulley 116, and a drive belt 134 couples the driver pulley 118 to the follower pulley 130. The tension of the drive belt 132 can be adjusted by changing the position of the motor 104 on the bracket 102 using the motor tensioning mechanism (e.g., slots 107 and fasteners 109), and the tension of the drive belt 134 can be adjusted independently of the tension in the drive belt 132 by changing the position of the bracket 120 relative to the bracket 102 using the bracket tensioning mechanism (e.g., slots 121 and fasteners 122).

As illustrated in FIGS. 3A-3B and 8A-8C, in some embodiments, the drive mechanism 100 can further include a bracket 136 having three or more arms 138, and used to support the shaft 112 on the bracket 102. Thus, as illustrated in, e.g. FIGS. 3A-3C and 5A-5D, distal ends of the arms 138 of the bracket 136 can be respectively coupled to the bracket 102 by corresponding standoffs 140 engaged with nuts 143, such that the bracket 136 is disposed above and substantially parallel to an opposing surface of the bracket 102. The shaft 112 can thus have an end directly coupled to the bracket 102 and an opposite end coupled to a center of the bracket 136 (e.g., see FIG. 3B). This arrangement provides a strong rigid support for both the shaft 112 and the pulley assembly 114 rotatably mounted thereon.

FIG. 4 is a partial left side elevation view of the drive mechanism 100 similar to that of FIG. 3B, but in which the brackets 102 and 120 have been omitted to show only the motor 104, the pulleys 110, 116, 118, and 130 and representative portions of drive belts 132 and 134 that respectively couple pulley 110 to pulley 116, and pulley 118 to pulley 130. As can be seen in FIG. 4, the drive mechanism 100 illustrated comprises a two-stage compound belt drive, in that it includes two drive stages $S_1$ and $S_2$ coupled to each other and a "compound" pulley assembly 114 including pulleys 116 and 118 coupled together for conjoint rotation.

Although drive mechanism 100 is illustrated using compound pulley assembly 114, any reasonable number of pulleys and corresponding drive belts may be used (e.g., disposed between the pulleys 110 and 130 in the chain of pulleys and drive belts to obtain a wide range of speed, torque reduction, and/or multiplication values, depending on the particular application at hand). Similarly, although the respective centers of the pulleys 110, 116, and 130 are shown in particular relative positions, each be positioned at a number of other positions relative to the others to enable a wide variety of equivalent but more compact drive mechanisms to be obtained.

Referring to FIG. 4, the motor tensioning mechanism can be used to position the motor 104, the output shaft 106, and the pulley 110 relative to the bracket 102 and the pulley assembly 114 to adjust a distance $D_1$ corresponding to the distance between the centers of the pulleys 102 and 116. As a result, the tension of drive belt 132 may be adjusted (e.g., by sliding motor 104 relative to bracket 102). The bracket tensioning mechanism can be used to position the bracket 120, the pulley shaft 126, and the pulley 130 relative to the bracket 102 and the pulley assembly 114 to adjust a distance $D_2$ corresponding to the distance between the centers of the pulleys 118 and 130. As a result, the tension of drive belt 134 may be adjusted (e.g., by sliding bracket 102 relative to bracket 120). The motor tensioning mechanism and the bracket tensioning mechanism may operate independently of each other such that the tension in either drive belt 132 or 134 can be adjusted as desired.

Although the drive belts 132 and 134 and pulleys 110, 116, 118, and 130 are illustrated as cog or timing belts and pulleys (e.g., having complementary lands and grooves disposed on their respective mating inner and outer surfaces) other belt types may be used such as flat belts, vee-belts, round belts (e.g., having a circular cross-section), chain belts (e.g., comprising links of various types), together with corresponding complementary pulley types.

In the examples discussed herein, drive mechanism 100 is used to position the ball 13 of the imaging system 10 with a high degree of precision in angular elevation. Accordingly, in some embodiments, belts 132 and 134 may be implemented as cog or timing belts, as they resist slippage and may be operated with very little tension. In some embodiments, the motor 104 may be implemented as a stepper motor because of its ability convert a train of electrical input pulses into precisely defined increments in the position of its output shaft 106. Additionally, as illustrated in, e.g., FIG. 3C, in some embodiments, it is possible to incorporate a rotational encoder sensor 141 coupled, e.g., to the second bracket 120, and a rotational encoder target 138 coupled, e.g., to an inner face of the second follower pulley 130 for conjoint rotation therewith. The sensor 141 can be used to sense the angular position of the second follower pulley 130, and hence, ball 13 to which it is coupled, to generate a signal corresponding thereto, and the signal can be used by an appropriate controller to control the motor 104 such that the angular or tilt position of the ball 13 can be controlled automatically and with a high degree of precision.

Figure 8C:
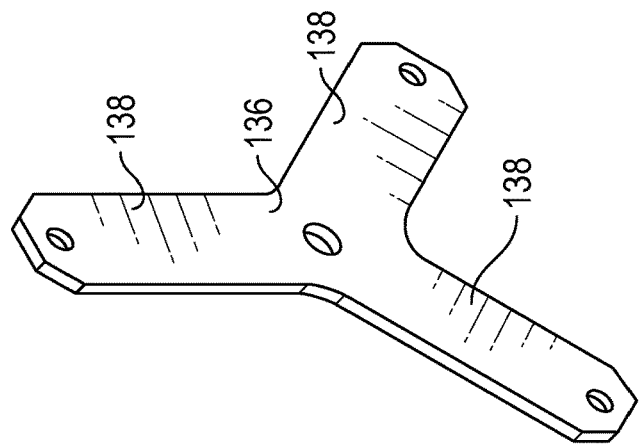
FIGS. 8A, 8B, and 8C are front elevation, side elevation, and upper rear perspective views, respectively, of the third or trefoil bracket of the example bracket assembly of FIGS. 5A-5D.
Figure 8B:
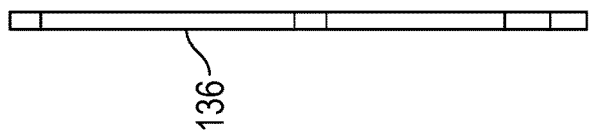
Figure 8A:
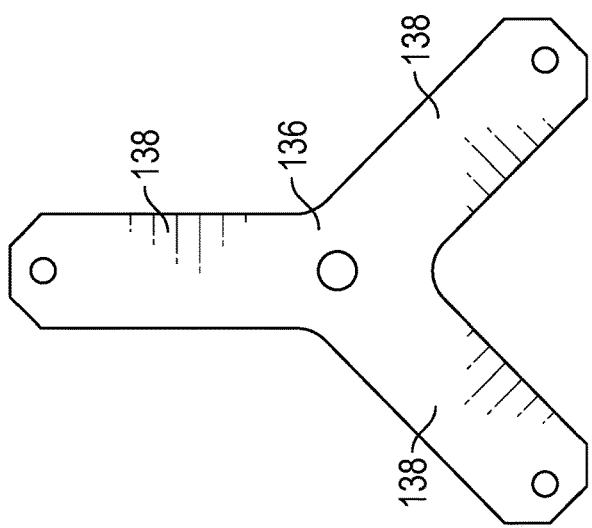

FIGS. 5A, 5B, 5C, and 5D are front elevation, left side elevation, rear elevation, and right side elevation views, respectively, of a chassis 144 (e.g., a bracket assembly) formed by an assembly of bracket 102, bracket 120, and bracket 136. In FIGS. 5A-5D, motor 104, pulleys 110, 116, 118, and 130, and drive belts 132 and 134 have been omitted for purposes of illustration. FIGS. 6A, 6B, 6C, 6D, 6E, 6F, and 6G are front elevation, left side elevation, rear elevation, right side elevation, upper, rear and left side perspective, upper end, and lower end views, respectively, of bracket 102. FIGS. 7A, 7B, 7C, 7D, 7E, 7F, and 7G are front elevation, left side elevation, rear elevation, right side elevation, upper, rear and left side perspective, upper end, and lower end views, respectively, of bracket 120. FIGS. 8A, 8B, and 8C are front elevation, side elevation, and upper rear perspective views, respectively, of bracket 136.

As can be seen in FIGS. 6A-6G, 7A-7G, and 8A-8C, any or all of the three brackets 102, 120, and/or 138 can comprise a stamping that is, for example, die-cut from a sheet of milled steel and then formed to incorporate one or more stiffening side walls and/or bends using, e.g., a manual or an automated bending brake, to result in a strong, rigid chassis 144 for mounting the rotational components of the belt drive 100. Of course, other materials and methods of fabrication and assembly can also be used to provide the chassis 144.

Figure 9B:
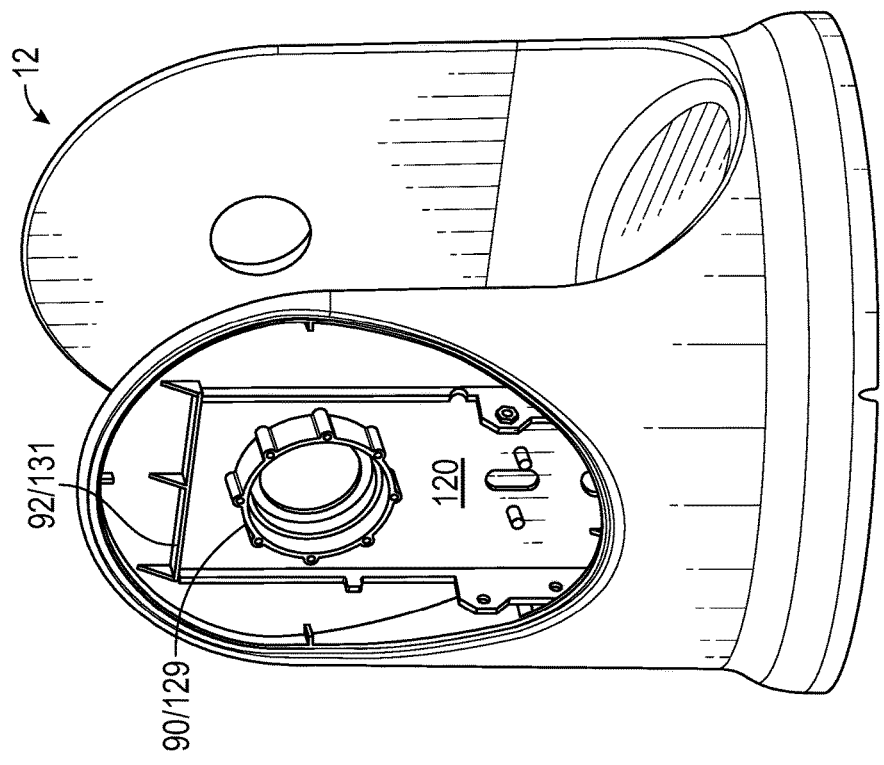
FIG. 9B illustrates an example embodiment of a housing and a bracket of the imaging system of FIG. 1 in accordance with the present invention.
Figure 9A:
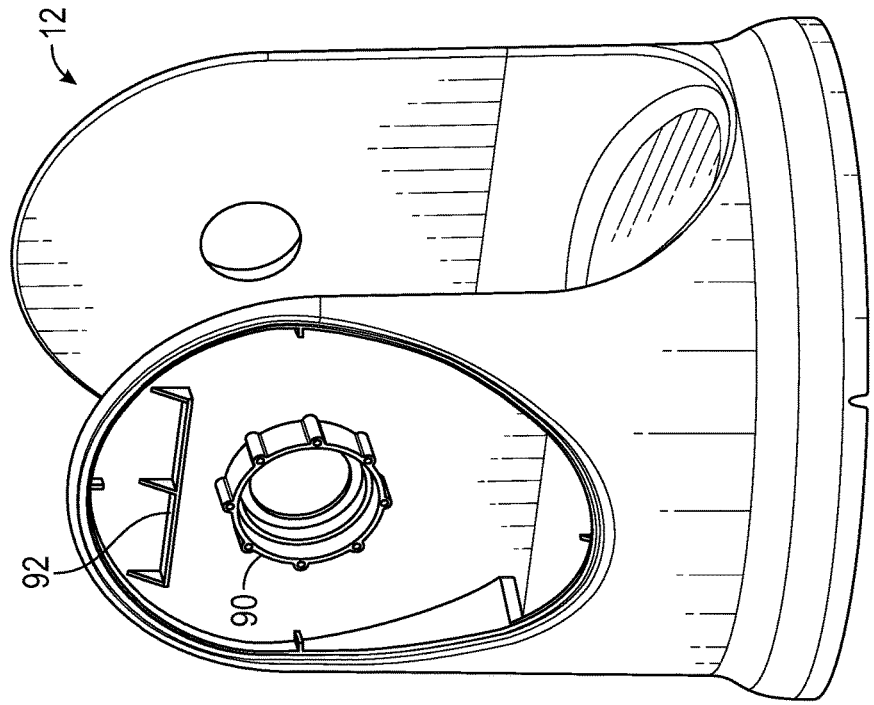
FIG. 9A illustrates an example embodiment of a housing of the imaging system of FIG. 1 in accordance with the present invention.

In some embodiments, chassis 144 can be mounted so as to reduce or eliminate the effects of thermal expansion and compression of housing 12 on the tension exhibited by belts 132 and 134. For example, FIG. 9A illustrates housing 12, and FIG. 19A illustrates housing 12 with bracket 120 installed thereon. Housing 12 includes mounting features 90 and 92 configured to interface with complementary mounting features of bracket 120. For example, bracket 120 includes an aperture 129 (see FIGS. 5A, 5C, 7A, 7C, and 7E) configured to receive mounting feature 90 in a complementary engagement (e.g., aperture 129 includes a pattern of notches configured to receive complementary portions of mounting feature 92). Bracket 120 also includes a top edge 131 (see FIGS. 5A, 5C, 7A, 7C, and 7E) configured to be received by mounting feature 92. The engagement of mounting features 90/91 with bracket mounting features 129/131 permit bracket 120 to be fixed relative to housing 12. Bracket 120 may be attached to housing 12, for example, by fasteners 146 (see FIG. 3C).

As discussed, bracket 102 is attached to bracket 120 by a bracket tensioning mechanism including, for example, slots 121 and fasteners 122. In this regard, bracket 102 may be suspended from bracket 120 without bracket 102 directly engaging with housing 12. As also discussed, motor 104 is attached to bracket 102 by a motor tensioning mechanism including, for example, slots 107 and fasteners 109. Thus, in some embodiments, the entirety of drive mechanism 100 may be suspended from housing 12 through bracket 120 and without motor 104 directly engaging with housing 12.

As a result, the chassis 144 and the other components of the drive mechanism 100 attached to the chassis 144 will essentially "float" relative to the housing 12 and therefore not subject to dimensional changes occurring in housing 12. For example, as housing 12 experiences thermal expansion, thermal compression, and/or other dimensional changes, pulley 118 will not move substantially in relation to pulley 130 (dimension $D_2$), thus maintaining the tension of belt 134. Similarly, pulley 116 will not move substantially in relation to pulley 110 (dimension $D_1$), thus maintaining the tension of belt 132. For example, brackets 102/120, motor 104, the bracket tensioning mechanism, and the motor tensioning mechanism (e.g., all made of metal or comparable materials) may experience significantly less or negligible dimensional changes in comparison to housing 12 (e.g., made of plastic or comparable materials). This reduction in dimensional changes associated with the various components of drive mechanism 100 can improve the overall reliability and reduce the maintenance associated with drive mechanism 100 and system 10 in general.

In some embodiments, the brackets 102, 120, and 138 may be made of material selected to have a coefficient of thermal expansion (CTE) that is substantially less than that of the housing 12. As a result, the dimensions $D_1$ and $D_2$ between the various pulleys 110, 116, 118, and 130 and the respective tensions in belts 132 and 134 may remain more constant than if the various pulleys 110, 116, 118, and 130 and motor 104 were mounted directly to housing 12 undergoing compression or expansion due to temperature changes.

In some embodiments, the brackets 102, 120, and 138 may be made of material selected to have strength and stiffness substantially greater than those of the housing 12. As a result, the dimensions $D_1$ and $D_2$ between the various pulleys 110, 116, 118, and 130 and the respective tensions in belts 132 and 134 may remain more constant in response to dimensional changes in housing 12 caused by, for example, stresses and strains on housing 12 as a result of use or storage of imaging system 10.

Other embodiments are also contemplated. For example, although several brackets 102 and 120 have been discussed, in some embodiments, a single bracket may be used (e.g., all components of drive mechanism 100 may be attached to a single bracket). As another example, although several belts 132 and 134 have been discussed, in some embodiments, a single belt may be used (e.g., motor 104 may be connected to pulley 130 through a single belt). These and other embodiments may be combined as appropriate.

From the foregoing description, it will by now be clear to those of some skill in this art that many modifications, substitutions and variations can be made in and to the materials and configurations of the belt drive tensioning systems of the present invention, and in light thereof, that the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A system comprising:
   a housing;
   a fixed bracket assembly having a first portion secured to the housing and a second portion suspended therefrom;
   first and second pulleys attached to the second portion of the bracket assembly and fixed relative to each other by the bracket assembly;
   a payload configured to rotate in response to the first pulley;
   a belt engaged in tension with the first and second pulleys; and
   wherein the first and second pulleys are configured to remain thermally decoupled from the housing through the suspension of the second portion of the bracket assembly to reduce effects of thermal expansion of the housing on the belt tension.

2. The system of claim 1, wherein the belt is a first belt, the system further comprising:
   a third pulley configured to rotate with the second pulley;
   a fourth pulley;
   a second belt engaged in tension with the third and fourth pulleys; and
   wherein the third and fourth pulleys are attached to the second portion of the bracket assembly and configured to remain thermally decoupled from the housing through the suspension of the second portion of the bracket assembly to reduce effects of thermal expansion of the housing on the second belt tension.

3. The system of claim 2, wherein the bracket assembly comprises:
   a first bracket;
   a second bracket attached to the first bracket;
   wherein the second and third pulleys are rotatably coupled to the second bracket; and
   wherein the second bracket is suspended from the housing through the first bracket to reduce effects of thermal expansion of the housing on the second belt tension.

4. The system of claim 3, wherein the second bracket is configured to slide relative to the first bracket to selectively adjust the first belt tension.

5. The system of claim 3, further comprising a motor configured to drive the fourth pulley, wherein the motor is suspended from the housing through the second bracket to reduce effects of thermal expansion of the housing on the second belt tension.

6. The system of claim 5, wherein the motor is configured to slide relative to the second bracket to selectively adjust the second belt tension.

7. The system of claim 1, wherein the bracket assembly comprises:
   a first bracket;
   a second bracket attached to the first bracket;
   wherein the second pulley is rotatably coupled to the second bracket; and
   wherein the second bracket is suspended from the housing through the first bracket to reduce effects of thermal expansion of the housing on the belt tension.

8. The system of claim 1, wherein:
   the housing comprises a first material having a first coefficient of thermal expansion; and
   the bracket assembly comprises a second material having a second coefficient of thermal expansion less than the first material.

9. The system of claim 1, wherein:
   the system is an imaging system configured to be mounted on a watercraft;
   the imaging system further comprises a base;
   the housing is configured to rotate the payload in azimuth relative to the base; and
   the first pulley is configured to pivot the payload in elevation relative to the base.

10. The system of claim 1, wherein the payload comprises a thermal camera.

11. A method comprising:
    driving a belt engaged in tension with first and second pulleys;
    rotating the first pulley by the belt;
    rotating a payload of an imaging system in response to the rotation of the first pulley;
    wherein the imaging system comprises a housing and a bracket assembly having a first portion secured to the housing and a second portion suspended therefrom;
    wherein the first and second pulleys are attached to the second portion of the bracket assembly and fixed relative to each other by the bracket assembly; and
    wherein the first and second pulleys are configured to remain thermally decoupled from the housing through the suspension of the second portion of the bracket assembly to reduce effects of thermal expansion of the housing on the belt tension.

12. The method of claim 11, wherein the belt is a first belt, the method further comprising:
    driving a second belt engaged in tension with third and fourth pulleys; and
    wherein the third and fourth pulleys are attached to the second portion of the bracket assembly and configured to remain thermally decoupled from the housing through the suspension of the second portion of the bracket assembly to reduce effects of thermal expansion of the housing on the second belt tension.

13. The method of claim 12, wherein the bracket assembly comprises:
    a first bracket;
    a second bracket attached to the first bracket;
    the second and third pulleys are rotatably coupled to the second bracket; and
    the second bracket is suspended from the housing through the first bracket to reduce effects of thermal expansion of the housing on the second belt tension.

14. The method of claim 13, wherein the second bracket is configured to slide relative to the first bracket to selectively adjust the first belt tension.

15. The method of claim 13, further comprising driving the fourth pulley by a motor suspended from the housing through the second bracket to reduce effects of thermal expansion of the housing on the second belt tension.

16. The method of claim 15, wherein the motor is configured to slide relative to the second bracket to selectively adjust the second belt tension.

17. The method of claim 11, wherein the bracket assembly comprises:
    a first bracket;
    a second bracket attached to the first bracket;
    the second pulley is rotatably coupled to the second bracket; and
    the second bracket is suspended from the housing through the first bracket to reduce effects of thermal expansion of the housing on the belt tension.

18. The method of claim 11, wherein:
    the housing comprises a first material having a first coefficient of thermal expansion; and
    the bracket assembly comprises a second material having a second coefficient of thermal expansion less than the first material.

19. The method of claim 11, wherein:
    the imaging system is configured to be mounted on a watercraft;
    the rotating the payload comprises pivoting the payload in elevation relative to a base of the imaging system; and
    the method further comprises rotating the payload in azimuth relative to the base.

20. The method of claim 11, wherein the payload comprises a thermal camera.

* * * * *